Patented Sept. 29, 1953

2,653,927

UNITED STATES PATENT OFFICE 2,653,927

HETEROCYCLIC AZO-DYESTUFF

Charles Graenacher, Riehen, and Heinrich Bruengger and Adolf Emil Siegrist, Basel, Switzerland, assignors to Ciba Limited, Basel, Switzerland, a Swiss firm No Drawing. Application July 13, 1950, Serial No. 173,672. In Switzerland July 22, 1949

7 Claims. (Cl. 260—152)

The present invention is based on the observations that new and valuable derivatives of azo-dyestuffs can be made by reacting one molecular proportion of an azo-dyestuff which is free from groups imparting solubility and contains the atomic grouping

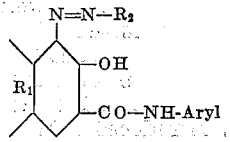

in which $R_1$ represents a cyclic radical condensed on to the benzene ring at the positions indicated by the valence bonds, and $R_2$ represents the radical of a diazo component free from acylamino groups with two molecular proportions of an acid monohalide of the general formula

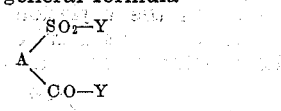

in which A represents a 5-membered heterocyclic ring consisting of 4 carbon atoms bound together by conjugate double bonds and one sulfur atom or advantageously one oxygen atom, and one Y represents a hydroxyl group and the other Y a halogen atom.

A large number of the dyestuffs of the above formula are known, especially as pigments produced on the fiber. As is known the dyestuffs can also be prepared in substance in a simple manner by coupling a diazo-compound free from acylamino groups and groups imparting solubility with a coupling component which contains the atomic grouping

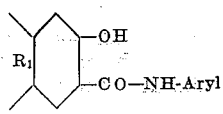

As diazo-compounds there may be used diazotized bases such as are customarily used for the manufacture of ice colors, for example, the diazo-compounds of 3-chloro-1-aminobenzene, 2:5-dichloro-1-aminobenzene, 2-trifluoromethyl-4-chloro-1-aminobenzene, 2-chloro-5-trifluoromethyl-1-aminobenzene, 2-ethylsulfone-5-trifluoromethyl-1-aminobenzene, 3:5-di-(trifluoromethyl)-1-aminobenzene, 2-nitro-1-aminobenzene, 2-nitro-4-chloro-1-aminobenzene, 2-nitro-4-methyl-1-aminobenzene, 2-nitro-4-methoxy-1-aminobenzene, 2-methoxy-5-nitro-1-aminobenzene, 2-methyl-4-chloro-1-aminobenzene, 2-methoxy-5-chloro-1-aminobenzene, 3:2'-dimethyl-4-amino-1:1'-azobenzene and 1-aminonaphthalene;

As coupling components there may be used, for example, compounds of the general formulae

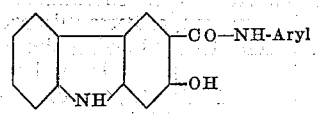

and especially those of the general formula

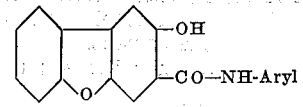

and above all those of the general formula

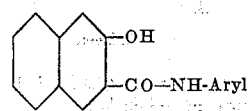

The aryl radical may be, for example, a napthalene radical or a radical of the benzene series such, for example, as phenyl, 2-methylphenyl, 2-methoxy-phenyl, 4-chloro-2-methylphenyl, 2:5-dimethoxy-4-cholor-phenyl, 2:4-dimethoxy-5-cholor-phenyl, 2-methyl-4-methoxyphenyl and the like.

As acid monohalides of the above mentioned formula

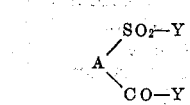

there comes in consideration for use in the present process the monohalides, for example, the mono-bromides and above all the monochlorides, of furane-2-carboxylic acid-3-sulfonic acid, of 3:4-dicholorofurane-2-carboxylic acid-5-sulfonic acid, of 5-chlorofurane-2-carboxylic acid-3-sulfonic acid, of 5-bromo-furane-2-carboxylic acid-3-sulfonic acid, and especially of thiophene-2-carboxylic acid-5-sulfonic acid or advantageously of furane-2-carboxylic acid-5-sulfonic acid.

There may be used as acid halide for this invention either a sulfonic acid halide-carboxylic acid of the constitution

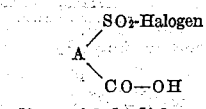

or a carboxylic acid halide-sulfonic acid of the constitution

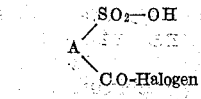

For the present invention there are principally suitable those acid halides of the above kind which contain the group —CO—Halogen, especially the group —COCl, wherein the —SO₃H group also capable of forming an acid halide group is not converted into an —SO₂—Halogen group.

The acid halides of the general formula

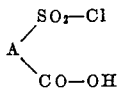

which are also suitable for the instant process may be obtained, for example, by reacting a carboxylic acid of the formula

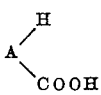

with chlorosulfonic acid. The preparation is advantageously carried out by introducing the acid in question at room temperature into an excess of chlorosulfonic acid, then allowing the mixture to react for a short time at a higher temperature, for example, at about 100° C., cooling the mixture and pouring it on to ice, taking up the resulting acid chloride in an organic solvent, for example, in ether, dehydrating the resulting solution, and finally distilling off the solvent.

Acid halides of the general formula

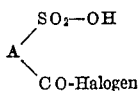

may be prepared, for example, by sulfonating an acid halide of the constitution

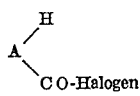

The sulfonation may be conducted, for example, at a low temperature by means of sulfur trioxide in liquid sulfur dioxide or with special advantage in methylene chloride (CH₂Cl₂).

An especially advantageous method for preparing acid halides of the last mentioned formula consists in reacting an acid of the formula

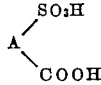

especially furane-2-carboxylic acid-5-sulfonic acid with the aid of an aromatic sulfonic acid halide such as benzene sulfonic acid chloride, para-toluene sulfonic acid bromide or para-toluene sulfonic acid chloride, or, with special advantage, with the aid of phosgene. As a rule it is desirable to conduct this reaction in the presence of a tertiary organic base, for example, trimethylamine, triethylamine, N-methyl-morpholine or advantageously pyridine. When the reaction is conducted in the absence of pyridine and in the presence of trimethylamine or triethylamine, it is generally of advantage in order to obtain a smooth reaction to work with the addition of an inert organic solvent such as benzene, chlorobenzene, ortho-dichlorobenzene, 1:2:4-trichlorobenzene, nitrobenzene, dioxane, etc. These methods also have the advantage that the mixture so obtained, which contains the desired carboxylic acid halide-sulfonic acid, can be used directly for reaction with the dyestuffs in accordance with the present process.

Such mixtures are advantageously prepared by first introducing the acid of the formula

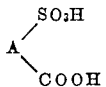

into pyridine, and then adding at a moderately raised temperature, for example, at 30–40° C., the acid halide (for example, para-toluene sulfonic acid chloride), or introducing gaseous phosgene.

An especially valuable acylating agent is obtained by adding to the mixture obtained as described above an additional tertiary base which is stronger than pyridine, for example, trimethylamine or advantageously triethylamine. Thus, for example, the dibasic acid of the formula

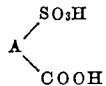

may be mixed with pyridine, then the acid halide is added or phosgene is introduced, and finally triethylamine is also added. Alternatively, such dibasic acid may be mixed with an inert organic solvent, a suitable tertiary base (advantageously triethylamine) and the dyestuff, and then the acid halide is added to this mixture or phosgene is introduced into it. Finally, an acid halide of the formula first given above, such, for example, as furane- or thiophene-2-carboxylic acid chloride-5-sulfonic acid (prepared, for example, by one of the other methods described above), may be mixed with the addition of an inert organic solvent with triethylamine and the dyestuff, and the acylation of the dyestuff is then carried out at a raised temperature. By all these methods the radical

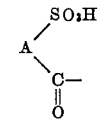

is very easily introduced twice into the dyestuff molecule. Thus, on the one hand, the hydroxyl group of the radical of the coupling component is esterified and, on the other, a second acyl radical enters into the —NH—Acyl group. Even when an acid halide of the formula

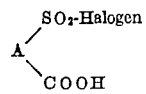

is used for the acylation there is obtained an acyl derivative of the above constitution and not one containing the acyl radical

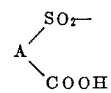

[see also Ruggli, Helvetica Chimica Acta, vol. 24, page 197 (1941)].

The dyestuff derivatives so obtained are generally easily soluble in water. It is easy to establish that no starting material is still present in the reaction mixture by ascertaining whether a test portion diluted with acidulated water contains any water-insoluble dyestuff.

The reaction mixture may be worked up, for example, by pouring the whole, after cooling, into a dilute mineral acid, for example, sulfuric acid, precipitating the dyestuff from the acid solution by the addition of sodium chloride, separating the dyestuff and, if desired, purifying it by dissolution in water and reprecipitation by means of sodium chloride. If the reaction mixture contains an organic solvent which is insoluble or sparingly soluble in water, the solvent may be removed, for example, by distillation, if desired, under reduced pressure, after the introduction of the mixture into dilute mineral acid and the addition of sodium chloride.

The dyestuff derivatives obtainable by the present process are new. According to present general knowledge (see Helvetica Chimica Acta, vol. 24, Fasc. Extraord., pages 50–57), they correspond to the general formula

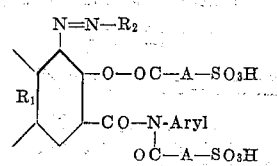

in which $R_1$ represents a cyclic radical condensed on to the benzene radical in the manner indicated, $R_2$ represents the radical of a diazo-component free from acylamino groups, and A represents a 5-membered heterocyclic ring consisting of 4 carbon atoms bound together by conjugate double bonds and one sulfur or oxygen atom. Apart from the —$SO_3H$ groups indicated in the formula they contain no groups imparting solubility.

The new dyestuff derivatives obtainable by the present process are relatively stable towards dilute acids, especially at low temperatures. However, they are surprisingly easily split up by weak alkalis with the regeneration of the insoluble dyestuff used as starting material. Thus, a quite short treatment with a cold dilute aqueous solution of ammonia suffices to reconvert these dyestuff derivatives practically completely into the original dyestuffs.

Owing to these properties the new dyestuff derivatives obtainable by the present process are very valuable products, which are especially suitable for the production of textile dyeings, for example, foulard dyeings, and for use in calico printing.

Very valuable results are obtained by treating with alkalis, preferably ammonia, prints produced in known manner by means of acid to neutral printing pastes, which contain a dyestuff derivative obtained by the present process. This treatment with alkali is advantageously carried out with weak and dilute alkalis, if desired, with gaseous ammonia. The present invention also includes such a printing process.

Dyestuff derivatives of a constitution similar to those of the present invention are described in British Patent No. 480,358. However, printing with these known dyestuff derivatives entails certain difficulties, since the hydrolysis of those products generally requires a certain time. If it is attempted in the case of prints produced with these known dyestuff derivatives to hydrolyze them, for example, by treatment with alkalis, the hydrolysis is frequently so slow that there is sufficient time for the soluble dyestuff derivative to be dissolved from the fiber. In this manner not only are the parts originally printed weakened in dyeing strength, but the dyestuff derivative removed by dissolution frequently colors the unprinted parts. By the process of British Patent No. 512,664 it is sought to overcome this disadvantage of the known products by carrying out the hydrolysis in a concentrated salt solution, the high salt content being intended to prevent dissolution of the soluble dyestuff derivative, or by adding small quantities of suitable salts such, for example, as alkaline earth metal salts, which rapidly convert the soluble dyestuff derivatives into sparingly soluble metal compounds and so retard the dissolution. However, these methods are always complicated and involve procedures so unusual for dyers that they cannot practice these methods.

As compared with these known methods the process by which the new products of the present invention are used, has the advantage that it is extraordinarily simple to carry out. The printing process itself as well as the necessary subsequent hydrolysis can be carried out by normal procedures and, apart from the new dyestuff derivatives, it involves the use of no abnormal substances, no relatively large quantities of auxiliary agents and no special apparatus. Furthermore, the ease with which the new dyestuff derivatives are hydrolyzed enables very rapid and smooth working and also protects the material to be printed and also the apparatus to a great extent from injurious influences, since neither high temperatures nor harmful reagents are necessary for the hydrolysis.

Moreover, the known dyestuff derivatives of British Patent No. 480,358 are not always satisfactory for dyeing fibers of animal origin, especially wool, because, owing to their resistance to alkalis, they can be hydrolyzed only by a relatively energetic or prolonged treatment with alkali, preferably a treatment with a solution of an alkali hydroxide. The dyestuff derivatives of the present invention, on the other hand, are very well suited for dyeing and printing wool, since, owing to their relatively good stability towards acids, they can be used for dyeing in the usual manner from acid baths, and then regenerated on the wool fiber to form the insoluble initial products by a very mild treatment which does not in any way injure the wool, for example, by a short treatment in a cold dilute solution of ammonia. Instead of carrying out the hydrolysis in the cold by a treatment with alkali, the azo-dyestuff derivatives applied by dyeing in the usual manner, for example, from a sulfuric acid bath, may be easily hydrolyzed on the fiber by a treatment of longer duration in a neutral to acid medium at a raised temperature, for example, at 95–100° C. In this way there are obtained valuable dyeings distinguished principally by good properties of wet fastness and good fastness to crocking.

The following examples illustrate the invention, the parts and percentages being by weight unless otherwise stated and the relationship of parts by weight to parts by volume being the same as that of the kilogram to the litre:

*Example 1*

3.65 parts of furane - 2 - carboxylic acid - 5 - sulfonic acid are dissolved in 40 parts by volume of dry pyridine, while stirring, and 4 parts of para-toluene-sulfochloride are added. When the para - toluene sulfochloride has dissolved, 1.8 parts of the azo dyestuff from diazotized 1- aminonaphthalene and (2' - hydroxy - 3' - naphthoylamino)-benzene are added, and the reaction mixture is heated up to 80–90° C. The dyestuff pigment rapidly dissolves and after a short time the initial violet-red coloration of the solution changes to brown. A test portion of the reaction mixture is then soluble in water to a clear solution. The reaction mixture is cooled to room temperature, and then stirred into a mixture of 150 parts of water and 21 parts of concentrated sulfuric acid, 10 parts of sodium chloride are added, and the whole is heated to 40–50° C., whereupon the reaction product precipitates well in the form of a resinous deposit. After pouring off the acid pyridine liquor, the residue is dissolved in 100 parts of water while heating to 40–50° C., and it is again precipitated in a resinous form by means of 5–10 parts of sodium chloride at 40–50° C., and the latter is separated from the salt solution and dried in vacuo at 40–50° C. The reaction product is a brown powder which dissolves easily in water to give a clear solution having a brown coloration, and is rapidly hydrolyzed by means of dilute alkalis, especially ammonia, to the insoluble initial bordeaux red pigment. As starting material there is advantageously used the dry furane-2-carboxylic acid-5-sulfonic acid free from water of crystallization and obtainable in the following manner:

Into a powerful kneading apparatus, which can be hermetically closed, are introduced 1121 parts of dry finely powdered furane-2-carboxylic acid and 1680 parts of methylene chloride which has been dried over sodium sulfate. The whole is thoroughly stirred for ½–1 hour, and then the mixture is cooled to 10–15° C. In the course of 3 hours 840 parts of sulfur trioxide are slowly introduced by distillation into the suspension of furane-2-carboxylic acid while continuously stirring, the temperature being maintained throughout between 10 and 15° C. The reaction mass becomes noticeably more fluid and acquires a dark brown color. When about 600–620 parts of sulfur trioxide have been introduced by distillation, the furane-2-carboxylic acid-5-sulfonic acid separates from the thinly liquid suspension in the form of a mass which becomes progressively more viscous, up to the end of the introduction of sulfur trioxide. The honey-like mass is stirred for a further 1–1½ hours while the temperature is maintained at 10 to 15° C. throughout. A slow crystallization of furane-2-carboxylic acid-5-sulfonic acid can then be observed, and the crystals agglomerate to form large slag-like structures. After further stirring at 10 to 15° C., these slag-like structures are disintegrated and after stirring for ½–1 hour the furane-2-carboxylic acid-5-sulfonic acid is obtained in the form of a dark green finely pulverized suspension. The whole is filtered with suction, while excluding moisture, in order to remove methylene chloride, and the furane-2-carboxylic acid-5-sulfonic acid is completely dried in vacuo at room temperature. (The methylene chloride may also be removed by distillation in vacuo at room temperature.) Furane-2-carboxylic acid-5-sulfonic acid is obtained in quantitative yield (calculated on the initial furane-2-carboxylic acid) in the form of a pale olive-green powder which is free from water of crystallization and is stable when stored with complete exclusion of moisture. It only becomes darker. The product decomposes very rapidly in the atmosphere.

*Example 2*

6.8 parts of the anhydrous disodium salt of furane-2-carboxylic acid-5-sulfonic acid are mixed with 30 parts by volume of dry pyridine, while stirring, 6.3 parts of para-toluene sulfochloride are added, and then 3.2 parts of the azo dyestuff from diazotized 1 - aminonaphthalene and (2' - hydroxy - 3' - naphthoylamino) - benzene are added. The reaction mixture is heated to 90–95° C. while stirring, and after the reaction has proceeded for ½ hour a test portion is soluble in water to give a clear solution. The acylation product is recovered in a manner corresponding to that described in Example 1, and the resulting brown reaction product is identical with the product of that example.

*Example 3*

18.6 parts of sodium furane-2-carboxylic acid-5-sulfonate free from water of crystallization ($C_5H_3O_6SNa$; prepared as described by Hill and Palmer, American Chemical Journal, vol. 10, page 373 [1888]) are mixed with 120 parts by volume of dry pyridine at 70–75° C., while stirring. 10 parts of the azo dyestuff from diazotized 3-chloro-1-aminobenzene and 1-(2'-hydroxy-3'-naphthoylamino)-2-methylbenzene are added, and 8.6 parts of phosgene are introduced in the course of 1½ hours in the form of a gaseous stream, the temperature being maintained throughout at 70–75° C. The red crystalline magma, consisting of the acid sodium salt of 5-sulfo-2-furane-carboxylic acid and the dyestuff pigment, becomes slowly darker, and both components slowly dissolve. After the addition of the phosgene the whole is maintained for a further 30–60 minutes at 70–75° C. until the pigment dyestuff has completely dissolved with a brown coloration, and a test portion of the reaction mixture is soluble in water to give a clear solution. After cooling to room temperature, the whole is stirred into a cold mixture of 450 parts of water and 63 parts of concentrated sulfuric acid. By the addition of 45 parts of sodium chloride the reaction product is salted out in the form of an oily mass which agglomerates upon heating to 40–45° C. so that, after cooling, the sulfuric acid-pyridine liquor can be separated satisfactorily. The reaction product is dissolved with 500 parts of water and 7 parts by volume of acetic acid of 10 per cent strength and is again salted out with 70 parts of sodium chloride. After being dried at 40–50° C. in vacuo, the reaction product is an orange-brown powder which dissolves easily in water to give a clear solution having an orange-brown coloration, and after the addition of a dilute alkali immediately hydrolyzes to the insoluble initial pigment.

*Example 4*

19.2 parts of furane-2-carboxylic acid-5-sulfonic acid are dissolved in 90 parts by volume of dry pyridine, while stirring, and 18.6 parts of the azo dyestuff from diazotized 2:5-dichloro-1-aminobenzene and 1-(2'-hydroxy-3'-naphthoylamino)-2-methoxybenzene are added. 1.9 parts of phosgene are then introduced into the mixture at 30–40° C. in the course of about 2 hours, and then the mixture is heated to 90–95° C. After a short period of reaction (about ¼ hour) the dyestuff pigment dissolves, and a test portion of the reaction mixture dissolves in water to give a clear solution. The reaction mixture is cooled to room temperature, and stirred into a mixture of 350 parts of water and 40 parts of concentrated sulfuric acid. 25 parts of sodium chloride are added and the whole is heated to 40–50° C., whereupon the reaction product separates well in the form of a resinous deposit. After pouring off the acid pyridine liquor, the residue is dissolved in 400 parts of water while heating to 40–50° C., and it is again precipitated in a resinous form by means of 40 parts of sodium chloride at 40–50° C. and the salt liquor is removed. After redissolution in water and salting out with sodium chloride the reaction product is dried in vacuo at 40–50° C. It is an orange-brown to red-brown powder, which corresponds to the formula

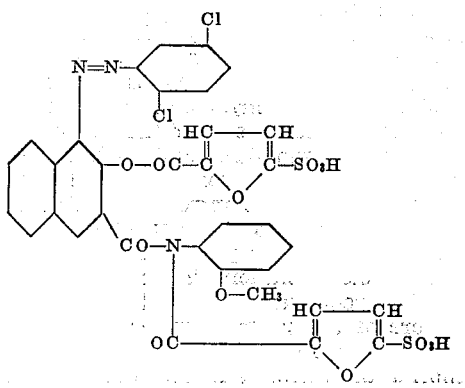

It dissolves easily in water to give a clear solution having an orange-brown coloration, and which rapidly separates upon hydrolysis with a dilute alkali in the form of the insoluble initial pigment.

The same reaction product can also be obtained by using, instead of phosgene, 20.8 parts of para-toluene sulfochloride. The reaction can also be carried out with the same success by adding the insoluble azo dyestuff only after the addition of the para-toluene sulfochloride or the phosgene, and then raising the mixture to the reaction temperature. Finally, it is also possible to introduce the phosgene at a reaction temperature of 70–75° C. into the reaction mixture consisting of a mixture of furane-2-carboxylic acid-5-sulfonic acid and the pigment in pyridine, the acylation also following the complete introduction of phosgene.

*Example 5*

9.6 parts of furane-2-carboxylic acid-5-sulfonic acid are dissolved in 50 parts by volume of dry pyridine while stirring, and 8 parts of the azo-dyestuff from diazotized 2:5-dichloro-1-aminobenzene and 1-(2'-hydroxy-3'-naphthoylamino)-2-ethoxybenzene are added. To the reaction mixture are added 10.5 parts of para-toluene sulfochloride and then 21.3 parts of triethylamine. The reaction mixture is then heated at 85–95° C. while stirring, the acylation taking place in a reaction period of about ½ hour, and a test portion of the reaction mixture being then soluble in water to give a clear solution. The reaction product obtained in the manner hereinbefore described by introduction into dilute sulfuric acid and salting out with sodium chloride, is a pale brown powder which dissolves easily in water to give a clear solution having an orange-brown coloration. In aqueous solution the reaction product can be hydrolyzed rapidly to form the initial insoluble pigment by the addition of dilute alkalis.

*Example 6*

10.4 parts of thiophene-2-carboxylic acid-5-sulfonic acid are dissolved in 60 parts by volume of dry pyridine, while stirring, and 7.75 parts of the azo dyestuff from diazotized 2:5-dichloro-1-aminobenzene and 1-(2'-hydroxy-3'-naphthoylamino)-2-methoxybenzene are added. 6 parts of phosgene are then introduced into the reaction mixture at 30–40° C. in the course of 1–1½ hours, and then the mixture is heated to 90–95° C. After a reaction period of about ¼ hour the pigment dissolves, and a test portion of the reaction mixture is soluble in water to give a clear solution. The reaction mixture cooled to room temperature is then stirred into a mixture of 250 parts of water and 25 parts of concentrated sulfuric acid, 15 parts of sodium chloride are added, and the whole is heated to 40–50° C., whereupon the reaction product separates well in the form of a resinous deposit. After pouring off the acid pyridine liquor, the residue is dissolved in 200 parts of water at 40–50° C., while stirring, and is again separated in resinous form by means of 15 parts of sodium chloride at 40–50° C. The salt solution is separated, and the reaction product is then dried in vacuo at 40–50° C. It is an orange-brown product which dissolves easily in water to give a clear solution, and again yields the initial insoluble pigment by hydrolysis with a dilute alkali.

*Example 7*

6 parts of furane-2-carboxylic acid-5-sulfonic acid are mixed with 40 parts by volume of dry benzene and 16 parts of triethylamine are added. 6.5 parts of para-toluene sulfochloride and then 1 part of the azo dyestuff from diazotized 1-aminonaphthalene and (2'-hydroxy-3'-naphthoylamino)-benzene are added to the reaction mixture. The latter is then heated to the boil, whereupon the bordeaux initial pigment slowly dissolves and a brown oily reaction product is obtained, which deposits on the walls of the vessel. After pouring off the benzene solution, the reaction product is taken up with water and salted out with sodium chloride. After being dried in vacuo, the reaction product is a brown powder which dissolves easily in water to give a clear solution having a brown coloration, and is rapidly hydrolyzed by means of a dilute alkali to the insoluble bordeaux initial pigment.

*Example 8*

7.7 parts of furane-2-carboxylic acid-5-sulfonic acid are dissolved in 50 parts by volume of dry pyridine, while stirring, and 5.1 parts of the azo dyestuff from diazotized 4-chloro-2-methyl-1-aminobenzene and 3:2-hydroxydiphenylene oxide carboxylic acid-2':5'-dimethoxy anilide are added. 8.3 parts of para-toluene sulfochloride are then added to the reaction mixture, and the latter is heated to 70–75° C. while stirring. After a reaction period of a few minutes the dark brown initial pigment dissolves, and a test portion of the reaction mixture dissolves in water to give a clear solution. The reaction mixture is cooled to room temperature and stirred into a mixture of 200 parts of water and 23 parts of concentrated sulfuric acid, 15 parts of sodium chloride are added, and the whole is heated to 40–50° C., whereupon the reaction product separates well in the form of a resinous deposit. After pouring off the acid pyridine liquor, the residue is dissolved in 150 parts of water while heating to 40–50° C., the reaction product is salted out with 15 parts of sodium chloride at 40–50° C., the salt liquor is separated, and the reaction product is dried at 40–50° C. in vacuo. The reaction product is an orange-brown powder which dissolves easily in water to form a clear orange solution and is again separated by hydrolysis with a dilute alkali in the form of the insoluble black-brown initial pigment.

Example 9

4.2 parts of furane-2-carboxylic acid-5-sulfonic acid chloride are dissolved in 30 parts by volume of dry pyridine while gently heating, 2.1 parts of the azo dyestuff from diazotized 1-aminonaphthalene and (2'-hydroxy-3'-naphthoylamino)-benzene are added, and the reaction mixture is then heated to 90–95° C. while stirring. After a reaction period of about ½ hour, the initial bordeaux pigment will have dissolved and a test portion of the reaction mixture will have become soluble in water to give a clear solution having a brown coloration. The reaction mixture is cooled to room temperature and then stirred into a mixture of 120 parts of water and 15 parts of concentrated sulfuric acid, 7 parts of sodium chloride are added and the whole is heated to 40–45° C., whereupon the reaction product precipitates well in the form of a resinous deposit. After pouring off the acid pyridine liquor, the residue is dissolved in 100 parts of water while heating to 40–50° C., the product is salted out with 10 parts of sodium chloride, and the precipitated reaction product is separated. The reaction product is a brown-red powder which dissolves easily in water to give a clear solution having a brown-red coloration, and can be hydrolyzed rapidly by means of dilute alkalis to form the initial insoluble bordeaux pigment. The furane-2-carboxylic acid-5-sulfonic acid chloride may be prepared in the following manner:

20 parts of furane-2-carboxylic acid are introduced at room temperature, while stirring into 80 parts of chlorosulfonic acid. The whole is then heated to 100° C. in the course of 30 minutes and maintained at that temperature for 2 hours. After cooling, the whole is poured on to 300 parts of ice, extracted with 100 parts of ether, the ethereal solution is dehydrated with anhydrous sodium sulfate, and the ether is distilled leaving behind furane-2-carboxylic acid-5-sulfonic acid chloride.

Example 10

7.3 parts of furane-2-carboxylic acid chloride-5-sulfonic acid are dissolved in 30 parts by volume of dry pyridine while stirring, 2.1 parts of the azo dyestuff from diazotized 1-aminonapthalene and (2'-hydroxy-3'-naphthoylamino)-benzene are added, and the reaction mixture is then heated to 90–95° C. After a reaction period of about ½ hour a test portion of the reaction mixture will have become soluble in water to give a clear solution. The product obtained by working up in the usual manner corresponds to the product of Example 9.

The furane-2-carboxylic acid chloride-5-sulfonic acid may be prepared in the following manner:

Into a flask fitted with stirring mechanism 26 parts of furane-2-carboxylic acid chloride are dissolved in 26 parts of methylene chloride while stirring, and the solution is then cooled to −10° C. A solution of 16.5 parts of sulfur trioxide in 24 parts of methylene chloride are then introduced dropwise in the course of 20 minutes while stirring and maintaining the temperature at −10° C. The whole is further stirred for 30 minutes, the temperature in the flask being allowed to rise to 0° C. The methylene chloride is distilled at room temperature leaving behind a brown reaction product, which is then dried in vacuo at room temperature overnight. The furane-2-carboxylic acid chloride-5-sulfonic acid is obtained in the form of a brown viscous product.

Example 11

13 parts of the anhydrous disodium salt of 5-chlorofurane-2-carboxylic acid-3-sulfonic acid (prepared as described by Hill and Hendrixson, American Chemical Journal, vol. 15, page 151 [1893]) are mixed with 60 parts by volume of dry pyridine while stirring, 9.2 parts of para-toluene sulfochloride are added, and then 5.0 parts of the azo dyestuff from diazotized 3-chloro-1-aminobenzene and 1-(2'-hydroxy-3'-naphthoylamino)-2-methylbenzene are introduced. The reaction mixture is heated to 75–80° C. while stirring, and after ½ hour a test portion is soluble in water to give a clear solution. The reaction mixture is cooled to room temperature, then stirred into a mixture of 250 parts of water and 32 parts of concentrated sulfuric acid, 30 parts of sodium chloride are added, and the whole is heated to 40–50° C., whereupon the reaction product separates well in the form of a resinous deposit. After pouring off the acid pyridine liquor, the residue is dissolved in 250 parts of water while heating at 40–50° C., the product is salted out with 30 parts of sodium chloride at 40–50° C., the salt solution is separated, and the reaction product is dried in vacuo at 40–50° C. The orange-brown product, which is soluble in water to give a clear solution, yields the initial insoluble pigment upon hydrolysis with dilute alkalis.

Example 12

15 parts of the anhydrous disodium salt of 5-bromo-furane-2-carboxylic acid-3-sulfonic acid (prepared as described by Hill and Palmer, American Chemical Journal, vol. 10, page 409 [1888]) are mixed with 60 parts by volume of dry pyridine while stirring, 12 parts of para-toluene sulfochloride are added, and then 5 parts of the azo dyestuff from diazotized 3-chloro-1-aminobenzene and 1-(2'-hydroxy-3'-naphthoylamino)-2-methylbenzene are introduced. The reaction mixture is heated to 70–75° C. while stirring, and after ¼ hour a test portion is soluble in water to give a clear solution. The reaction mixture is cooled to room temperature and worked up in exactly the same manner as is described in Example 11. The orange-brown product, which dissolves in water to give a clear solution, yields the initial insoluble pigment upon hydrolysis with dilute alkalis.

Example 13

22.6 parts of the anhydrous disodium salt of furane-2-carboxylic acid-3-sulfonic acid [prepared as described by Hill and Palmer, Proceedings of the American Academy, vol. 23, page 214 (1888)] are mixed with 120 parts by volume of dry pyridine while stirring, 18.4 parts of para-toluene sulfochloride are added, and then 10.0 parts of the azo dyestuff from 3-chloro-1-aminobenzene and 1-(2'-hydroxy-3'-naphthoylamino)-2-methylbenzene are introduced. The reaction mixture is heated to 75–80° C. while stirring for 40–80 minutes, and then refluxed for a short time in an oily bath. A test portion will then be soluble in water. The reaction mixture is cooled to room temperature, and stirred into a mixture of 450 parts of water and 63 parts of concentrated sulfuric acid, 60 parts of sodium chloride are added, and the whole is heated to 40–50° C., whereupon the reaction product separates well in the form of a resinous deposit. After pouring off the liquor containing sulfuric acid and pyridine sulfate, the residue is dissolved in 500 parts of water while heating at 40–50° C., filtered with suction, salted out with 60 parts of sodium chloride at 40–50° C., the salt solution is separated, and the reaction product is then dried in vacuo at 40–50° C. The orange-brown water-soluble reaction product yields the initial insoluble pigment upon hydrolysis with dilute alkalis.

Example 14

29.3 parts of the anhydrous disodium salt of 3:4 - dichlorofurane - 2 - carboxylic acid - 5-sulfonic acid [prepared as described by Hill and Hendrixson, American Chemical Journal, vol. 15, page 149 (1893)] are mixed with 120 parts by volume of dry pyridine while stirring, 22.6 parts of para-toluene sulfochloride are added, and then 10.0 parts of the azo dyestuff from diazotized 3-chloro-1-aminobenzene and 1-(2'-hydroxy-3'-naphthoylamino) - 2 - methylbenzene are introduced. The reaction mixture is heated at 75–80° C. for 40–80 minutes while stirring, and then refluxed for a short time in an oily bath. A test portion is then soluble in water. The reaction mixture is cooled to room temperature, stirred into a mixture of 450 parts of water and 63 parts of concentrated sulfuric acid, 60 parts of sodium chloride are added, and the whole is heated to 40–50° C., whereupon the reaction product separates in the form of a resinous deposit. After pouring off the liquor containing sulfuric acid and pyridine sulfate, the residue is dissolved in 500 parts of water while heating at 40–50° C., filtered with suction, salted out with 60 parts of sodium chloride at 40–50° C., the salt solution is separated, and the reaction product is then dried in vacuo at 40–50° C. The orange-brown water-soluble reaction product yields the initial insoluble pigment upon hydrolysis with dilute alkalis.

Example 15

4 parts of furane-2-carboxylic acid-5-sulfonic acid are dissolved in 40 parts of dry pyridine and 5.7 parts of para-toluene sulfobromide are added. 2 parts of the azo dyestuff from diazotized 3-chloro-1-aminobenzene and 1-(2'-hydroxy-3'-naphthoylamino)-2-methylbenzene are added to the reaction mixture, and the latter is then heated to 90–95° C. while stirring. After about ¼ hour, the pigment will have dissolved in the reaction mixture and a test portion of the dark yellow-brown solution will be soluble in water to give a clear solution. The reaction mixture is cooled to room temperature and introduced into dilute sulfuric acid, and completely precipitated by the addition of sodium chloride. After separating the liquor containing sulfuric acid and pyridine sulfate, and drying in vacuo at 40–50° C., the reaction product is obtained in the form of an orange-brown powder which dissolves in water to give a clear solution having an orange-brown coloration, and can be hydrolyzed rapidly with dilute alkalis to yield the initial insoluble pigment.

In the following table is given a list of further valuable azo-dyestuff derivatives which can be made by the present process by acylating the azo-dyestuff mentioned in column I with the acylating agent mentioned in column II:

| I<br>Azo-dyestuff | II<br>Acylating Agent | III<br>Color of aqueous solution of the acyl-compound | IV<br>Color of the product of hydrolysis |
|---|---|---|---|
| (1) Diaz. 4-chloro-2-methyl-1-aminobenzene → 1-(2'-hydroxy-3'-naphthoylamino)-2-methyl-4-chlorobenzene. | Furane-2-carboxylic acid-5-sulfonic acid+phosgene in pyridine. | red-brown | red. |
| (2) Diaz. 3-chloro-1-aminobenzene → 1-(2'-hydroxy-3'-naphthoylamino)-2-methoxybenzene. | ___do___ | orange-brown | orange-red. |
| (3) Diaz. 2:5-dichloro-1-aminobenzene → 1-(2'-hydroxy-3'-naphthoylamino)-4-methylbenzene. | Furane-2-carboxylic acid-5-sulfonic acid+para-toluene-sulfochloride in pyridine. | ___do___ | scarlet. |
| (4) Diaz. 5-chloro-2-methoxy-1-aminobenzene → 1-(2'-hydroxy-3'-naphthoylamino)-2-methoxybenzene. | ___do___ | red-brown | red. |
| (5) Diaz. 2:5-dichloro-1-aminobenzene → 1-(2'-hydroxy-3'-naphthoylamino)-2:5-dimethoxybenzene. | ___do___ | yellow-brown | brown. |
| (6) Diaz. 4-methoxy-2-nitro-1-aminobenzene → 1-(2'-hydroxy-3'-naphthoylamino)-2-methoxybenzene. | ___do___ | brown | bordeaux. |
| (7) Diaz. 4-nitro-2-methyl-1-aminobenzene → 1-(2'-hydroxy-3'-naphthoylamino)-2-methoxybenzene. | ___do___ | orange-brown | ruby. |
| (8) Diaz. 4-nitro-2-methyl-1-aminobenzene → 1-(2'-hydroxy-3'-naphthoylamino)-2-methylbenzene. | ___do___ | red-brown | Do. |
| (9) Diaz. 5-trifluoromethyl-2-chloro-1-aminobenzene → 1-(2'-hydroxy-3'-naphthoylamino)-2-methoxybenzene. | ___do___ | yellow-brown | orange. |
| (10) Diaz. 5-trifluoromethyl-2-chloro-1-aminobenzene → 1-(2'-hydroxy-3'-naphthoylamino)-benzene. | ___do___ | ___do___ | Do. |
| (11) Diaz. 5-chloro-2-methyl-1-aminobenzene → 1-(2'-hydroxy-3'-naphthoylamino)-2-ethoxybenzene. | ___do___ | orange-brown | scarlet. |
| (12) Diaz. 2-nitro-1-aminobenzene → 1-(2'-hydroxy-3'-naphthoylamino)-naphthalene. | ___do___ | red-brown | red. |
| (13) Diaz. 5-chloro-2-methyl-1-aminobenzene → 1-(2'-hydroxy-3'-naphthoylamino)-2-methylbenzene. | ___do___ | ___do___ | Do. |
| (14) Diaz. 4-chloro-2-methyl-1-aminobenzene → 1-(2'-hydroxy-3'-naphthoylamino)-2-methylbenzene. | ___do___ | ___do___ | Do. |
| (15) Diaz. 2-nitro-1-aminobenzene → 1-(2'-hydroxy-3'-naphthoylamino)-2-methylbenzene. | ___do___ | brown | Do. |
| (16) Diaz. 2:5-dichloro-1-aminobenzene → 1-(2'-hydroxy-3'-naphthoylamino)-benzene. | ___do___ | orange-brown | scarlet. |
| (17) Diaz. 4:4'dichloro-2-amino-diphenyl ether → 1-(2'-hydroxy-3'-naphthoylamino)-2-methoxybenzene. | ___do___ | ___do___ | red. |

| I | II | III | IV |
|---|---|---|---|
| Azo-dyestuff | Acylating Agent | Color of aqueous solution of the acyl-compound | Color of the product of hydrolysis |
| (18) Diaz. 2:5-dichloro-1-aminobenzene ⟶ 1-(2'-hydroxy-3'-naphthoylamino)-2-chlorobenzene. | Furane-2-carboxylic acid-2-sulfonic acid+paratoluene sulfochloride in pyridine. | ...do... | orange. |
| (19) Diaz. 3-chloro-1-aminobenzene ⟶ 1-(2'-hydroxy-3'-naphthoylamino)-benzene. | ...do... | yellow-brown. | Do. |
| (20) Diaz. 2:5-dichloro-1-aminobenzene ⟶ 1-(2'-hydroxy-3'-naphthoylamino)-3-chlorobenzene. | ...do... | orange-brown. | scarlet. |
| (21) Diaz. 3-chloro-1-aminobenzene ⟶ 1-(2'-hydroxy-3'-naphthoylamino)-2-methoxy-5-chlorobenzene. | ...do... | yellow-brown. | Do. |
| (22) Diaz. 4-chloro-2-aminodiphenyl ether ⟶ 1-(2'-hydroxy-3'-naphthoylamino)-benzene. | ...do... | orange-brown. | red. |
| (23) Diaz. 4-nitro-2-methyl-1-aminobenzene ⟶ 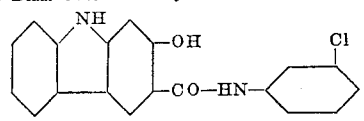 | ...do... | orange. | brown. |

The acyl compounds corresponding to items 6, 9, 13 and 14 of the foregoing table correspond to the following formulae:

(6)
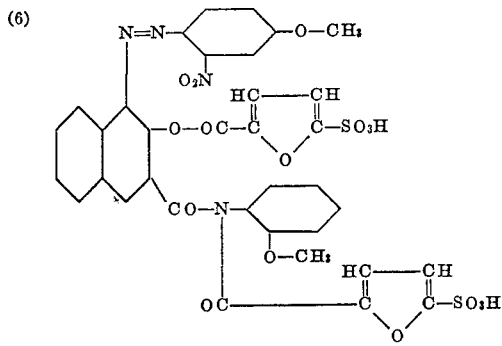

(9)
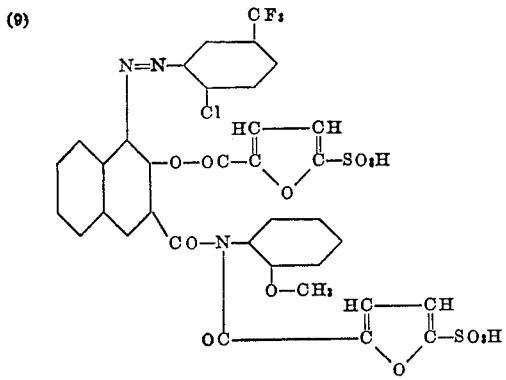

(13)
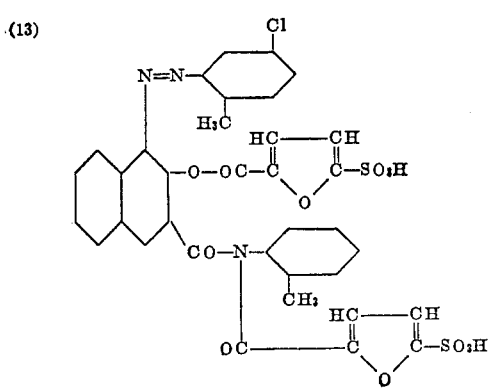

(14)
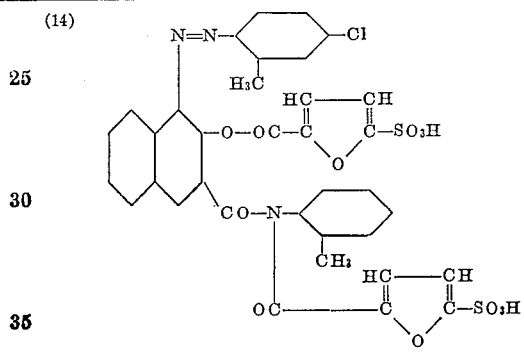

Example 16

A dyebath is prepared which consists of 5 parts of the product of the action of furane-2-carboxylic acid-5-sulfonic acid and phosgene on the azo-dyestuff from diazotized 2:5-dichloro-1-aminobenzene and 1-(2'-hydroxy-3'-naphthoylamino)-2-methoxybenzene (according to Example 4), 3000 parts of water and 50 parts of sulfuric acid of 10 per cent. strength. 100 parts of a wool fabric are entered at 40° C., the dyebath is then slowly raised to the boil in the course of 1 hour, and finally boiling is continued for a further ½ hour. During this period the dyestuff derivative is taken up completely by the wool and an orange-red dyeing is obtained. The dyeing is then developed at room temperature in an ammonia solution of 1 per cent. strength for about 5 minutes, rinsed, soaped for 10 minutes at 50° C. with a solution containing, per litre of water, 2 grams of the sodium salt of N-benzyl-heptadecyl-benzimidazole disulfonic acid, again rinsed, and dried. In this manner a strong brilliant scarlet dyeing having good to excellent properties of fastness is obtained.

Example 17

A printing paste is prepared consisting of 70 parts of the product obtainable as described in Example 4 by the action of furane-2-carboxylic acid-5-sulfonic acid and phosgene on the azo-dyestuff from diazotized 2:5-dichloro-1-aminobenzene and 1-(2'-hydroxy-3'-naphthoylamino)-2-methoxybenzene,
330 parts of water,
100 parts of thiodiglycol,
500 parts of neutral starch-tragacanth thickening
_____
1000 parts.

The above printing color is printed on a cotton fabric, and the print is dried and steamed for 5–10 minutes in a Mather-Platt apparatus. The print is then developed by a short passage (about 1–2 minutes) through an ammonia solution of 1–2 per cent. strength, and then malted and soaped at the boil. In this manner a fast brilliant scarlet print is obtained.

What we claim is:

1. An azo dyestuff derivative of the formula

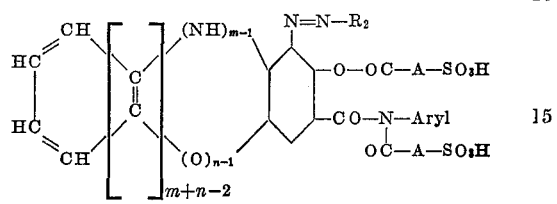

in which $n$ and $m$ represent whole numbers, the sum of which is at most 3, $R_2$ represents the radical of a diazo component, and A represents a five membered heterocyclic ring consisting of 4 carbon atoms bound together by conjugate double bonds and one atom selected from the group consisting of oxygen and sulfur, and which azo dyestuff derivative contains a single —CO—N-group and is free from substituents imparting solubility apart from the indicated sulfonic acid groups.

2. An azo dyestuff derivative of the formula

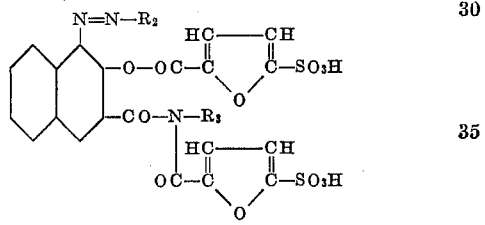

in which $R_2$ represents a benzene radical and $R_3$ represents a benzene radical, and which azo dyestuff derivative contains a single —CO—N-group and is free from substituents imparting solubility apart from the indicated sulfonic acid groups.

3. The azo dyestuff derivative of the formula

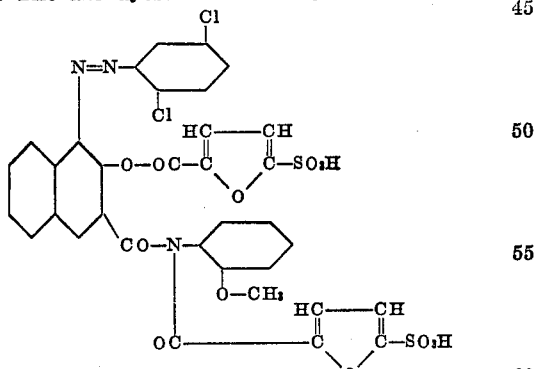

4. The azo dyestuff derivative of the formula

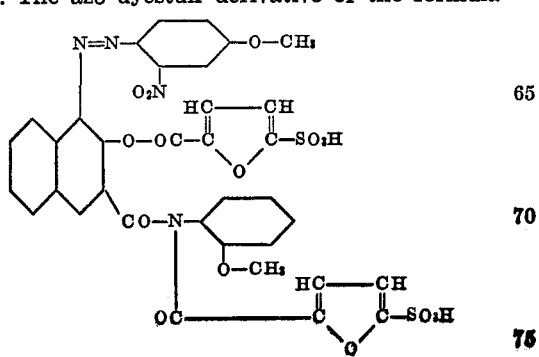

5. The azo dyestuff derivative of the formula

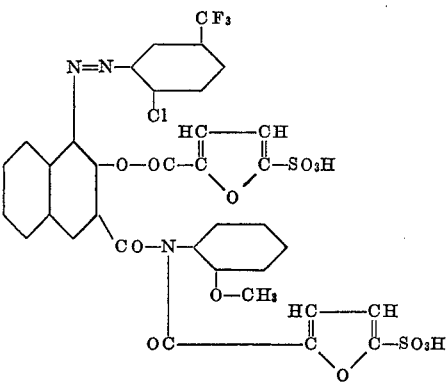

6. The azo dyestuff derivative of the formula

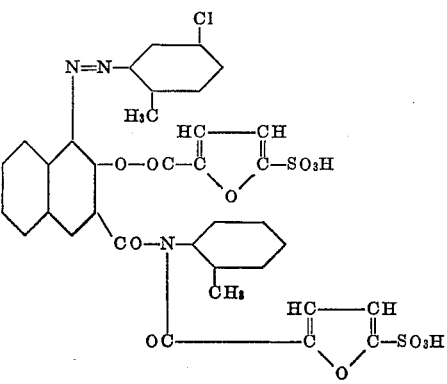

7. The azo dyestuff derivative of the formula

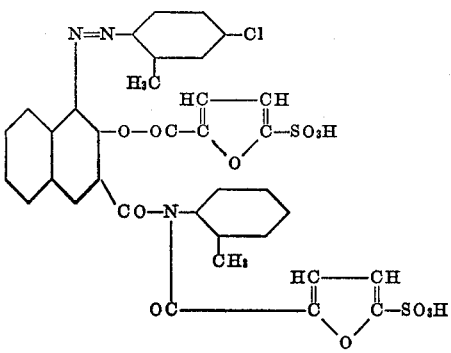

CHARLES GRAENACHER.
HEINRICH BRUENGGER.
ADOLF EMIL SIEGRIST.

References Cited in the file of this patent
UNITED STATES PATENTS

| Number | Name | Date |
|---|---|---|
| 2,064,332 | Zwilgmeyer | Dec. 15, 1936 |
| 2,074,186 | Markush | Mar. 16, 1937 |
| 2,276,187 | Graenacher et al. | Mar. 10, 1942 |